(12) United States Patent
Macdougall et al.

(10) Patent No.: US 12,135,313 B2
(45) Date of Patent: Nov. 5, 2024

(54) SYSTEM AND METHOD FOR APPLYING DYNAMIC LOADING TO A TEST SPECIMEN

(71) Applicant: ROLLS-ROYCE plc, London (GB)

(72) Inventors: Duncan A Macdougall, Derby (GB); Julian M Reed, Derby (GB); Sophoclis Patsias, Stockport (GB); Antonio Pellegrino, Oxford (GB); Clive R Siviour, Oxford (GB); Daniel Eakins, Oxford (GB); Yuan Xu, Oxford (GB); Junyi Zhou, Oxford (GB)

(73) Assignee: ROLLS-ROYCE plc, London (GB)

( * ) Notice: Subject to any disclaimer, the term of this patent is extended or adjusted under 35 U.S.C. 154(b) by 283 days.

(21) Appl. No.: 17/958,996

(22) Filed: Oct. 3, 2022

(65) Prior Publication Data
US 2023/0133728 A1      May 4, 2023

(30) Foreign Application Priority Data

Oct. 29, 2021    (CY) .................................. 202100002

(51) Int. Cl.
*G01N 3/30*      (2006.01)
*G01N 3/02*      (2006.01)

(52) U.S. Cl.
CPC ............... *G01N 3/30* (2013.01); *G01N 3/02* (2013.01); *G01N 2203/001* (2013.01)

(58) Field of Classification Search
USPC ........................................................ 73/12.09
See application file for complete search history.

(56) References Cited

FOREIGN PATENT DOCUMENTS

| CN | 108519283 A |   | 9/2018 |   |
|---|---|---|---|---|
| CN | 111366486 A |   | 7/2020 |   |
| CN | 113945466 A |   | 1/2022 |   |
| EP | 0410370 A1 |   | 1/1991 |   |
| GB | 2587397 A | * | 3/2021 | ............... G01N 3/08 |

OTHER PUBLICATIONS

Mar. 9, 2023 Search Report issued in European Patent Application No. 22198575.7.
May 24, 2022 Search Report issued in Great Britain Patent Application No. 2116883.6.

* cited by examiner

*Primary Examiner* — Clayton E. LaBalle
*Assistant Examiner* — Warren K Fenwick
(74) *Attorney, Agent, or Firm* — Oliff PLC

(57) ABSTRACT

A system for measuring loading on a test specimen. The system includes the test specimen arranged between a first loading bar and a second loading bar. The system further includes a first loading unit and a second loading unit configured to apply a first load and a second load to the first and second loading bars, respectively. The system further includes a first clamp and a second clamp configured to hold the first and second loading bars against the first and second loads, respectively. The system further includes a clamp actuating unit configured to selectively release at least the first clamp. The clamp actuating unit further includes a controller configured to electrically actuate at least one first electromechanical transducer from a retained state to a released state to release the first clamp, such that the first loading bar applies a first loading wave to the test specimen.

20 Claims, 8 Drawing Sheets

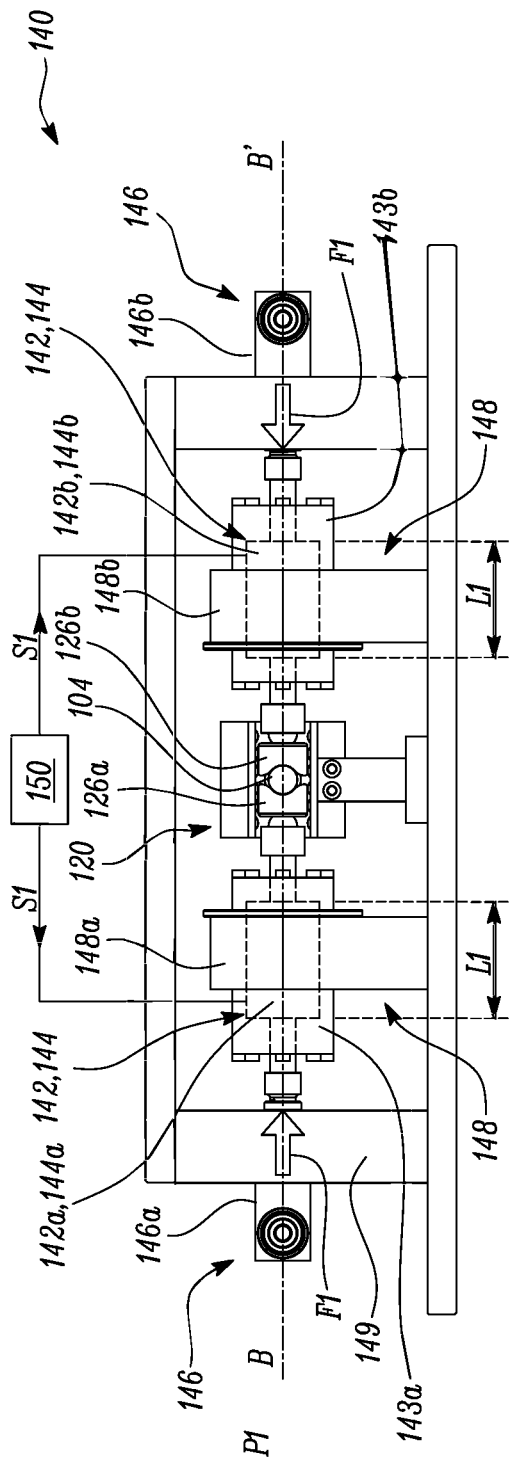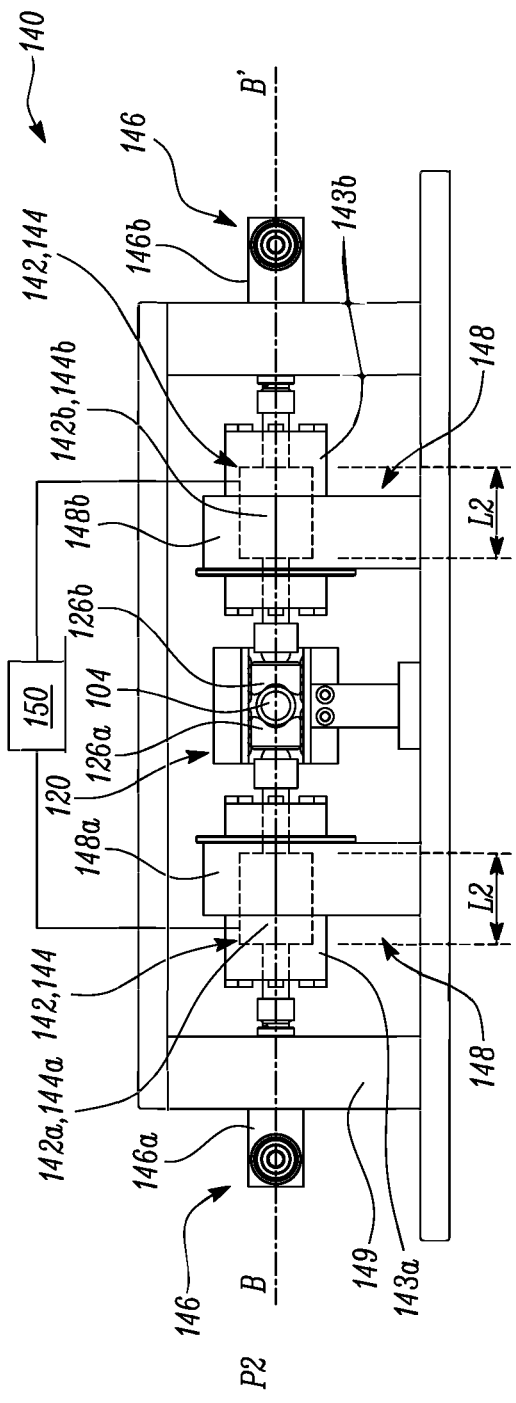
FIG. 5A
FIG. 5B

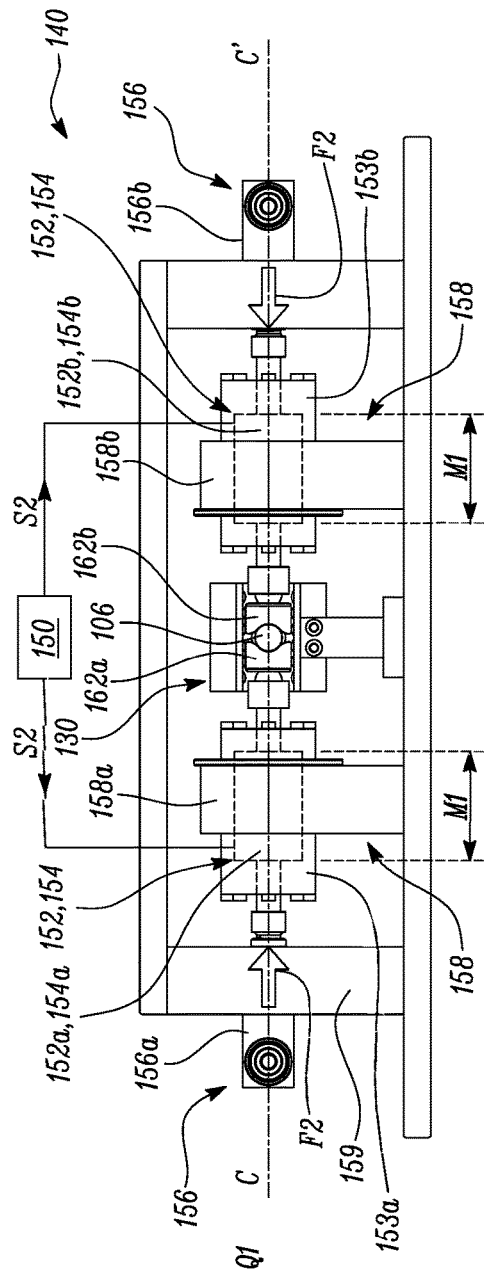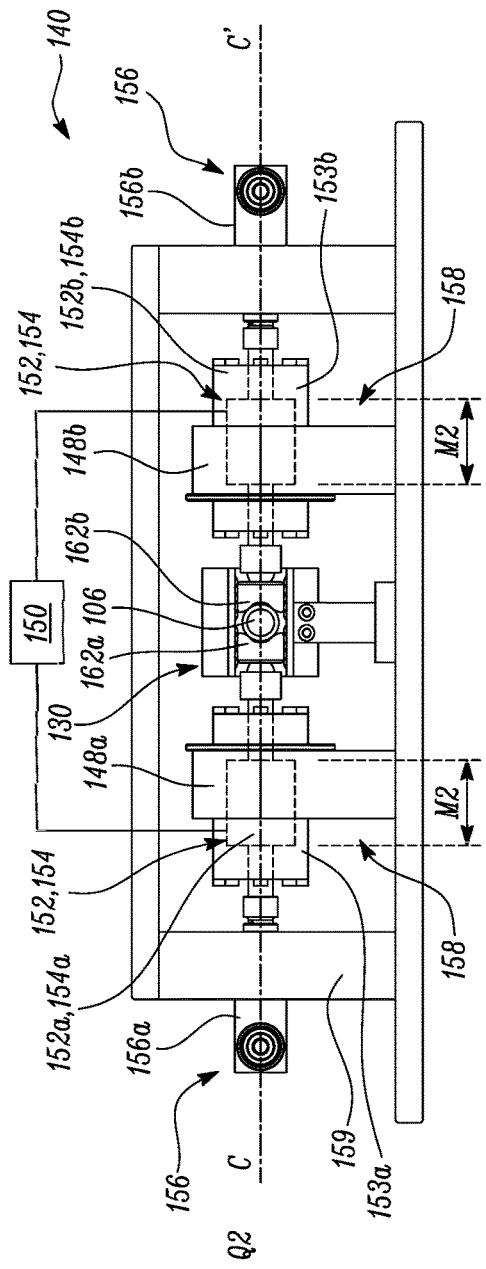

SYSTEM AND METHOD FOR APPLYING DYNAMIC LOADING TO A TEST SPECIMEN

CROSS-REFERENCE TO RELATED APPLICATIONS

This specification is based upon and claims the benefit of priority from Cypriot patent application number CY 202100002 filed on Oct. 29, 2021, the entire contents of which is incorporated herein by reference.

BACKGROUND

Field of the Disclosure

The present disclosure relates to a system and a method for applying dynamic loading to a test specimen.

Description of the Related Art

Engineering applications may require data on dynamic mechanical response of materials under high strain rate deformation. The split Hopkinson Pressure Bar (SHPB), also referred to as the Kolsky Bar, is a commonly used setup for testing materials at high strain rates. A specimen is sandwiched between two rods, each of which is instrumented with strain gauges. A stress wave, compression, tension, or torsion, is introduced into one of the rods (an input bar), which transmits the stress wave to the specimen. This causes the specimen to deform. A change in impedance between the rods and the specimen causes some of the stress wave to be reflected, and the rest to be transmitted (into an output rod). By measuring these three stress waves (incident, reflected and transmitted), a stress-strain response of the specimen can be inferred.

Known arrangements of SHPB for carrying out tests may allow testing in uniaxial stress in tension or in compression, and in pure shear. Some arrangements may also allow combined loading of torsion and tension/compression on the specimen. In such arrangements, torsion loading and tension/compression loading can be applied on separate rods on either end of SHPB or a single rod. Conventional SHPBs often utilize clamps to hold the rods under torsion, tension and/or compression until the load is to be released. As the clamps are released, the stress waves travel along the rods and are applied to the specimen. Multiple clamps may be utilized with SHPB based on arrangement of loading on the specimen.

Conventional clamps may typically include a mechanical fuse (e.g., a notched pin) which fractures to release the clamps. A release time of such mechanical clamp may not be controlled precisely and accurately by virtue of fracturing of the mechanical fuse. This may be problematic to the operation of SHPB since precise control of clamps is required to ensure that the arrival of the stress waves at the specimen is correctly synchronised in a combined loading arrangement. Further, the release time of mechanical clamps may not be accurately synchronized with the release time of other clamps if multiple clamps are utilized with SHPB.

SUMMARY

According to a first aspect there is provided a system for measuring loading on a test specimen. The system includes a first loading bar and a second loading bar arranged along a longitudinal axis. The test specimen is arranged between the first and second loading bars along the longitudinal axis. The system further includes a first loading unit coupled to the first loading bar and configured to apply a first load to the first loading bar. The system further includes a second loading unit coupled to the second loading bar and configured to apply a second load to the second loading bar. The system further includes a first clamp disposed between the first loading unit and the test specimen along the longitudinal axis. The first clamp is configured to hold the first loading bar against the first load. Upon release of the first clamp, the first loading bar is configured to apply a first loading wave to the test specimen in response to the first load. The system further includes a second clamp disposed between the second loading unit and the test specimen along the longitudinal axis. The second clamp is configured to hold the second loading bar against the second load. Upon release of the second clamp, the second loading bar is configured to apply a second loading wave to the test specimen in response to the second load. The system further includes a clamp actuating unit configured to selectively release at least the first clamp. The clamp actuating unit includes at least one first electromechanical transducer switchable between a retained state and a released state. In the retained state, the at least one first electromechanical transducer is configured to load the first clamp, such that the first clamp holds the first loading bar against the first load. In the released state, the at least one first electromechanical transducer is configured to release the first clamp. The clamp actuating unit further includes a controller configured to electrically actuate the at least one first electromechanical transducer from the retained state to the released state to release the first clamp, such that the first loading bar applies the first loading wave to the test specimen.

The clamp actuating unit may electrically actuate the at least one first electromechanical transducer between the retained state and the release state. Use of the at least one first electromechanical transducer may allow precise control of a release time of the first clamp, and thus, precise control of application of the first loading wave to the test specimen. Further, a response time of the first clamp may also be reduced since the system utilizes the at least one first electromechanical transducer as opposed to the conventional mechanical fuse which has relatively longer response time.

In some embodiments, the first clamp includes a pair of first clamping members configured to hold the first loading bar therebetween. The at least one first electromechanical transducer comprises a pair of first electromechanical transducers. Each first electromechanical transducer is configured to load a corresponding first clamping member from the pair of first clamping members. The pair of first electromechanical transducers may allow symmetric loading of the pair of first clamping members, thus eliminating any transverse bending forces on the first loading bar.

In some embodiments, the at least one first electromechanical transducer includes at least one first piezoelectric element configured to expand along a first transverse axis inclined to the longitudinal axis upon application of a first electrical signal. The at least one first piezoelectric element is further configured to contract along the first transverse axis upon removal of the first electrical signal. In the retained state, the at least one first piezoelectric element expands to load the first clamp, and in the released state, the at least one first piezoelectric element contracts to release the first clamp. Use of the at least one first piezoelectric element may reduce the response time of the first clamp as compared to conventional clamps utilizing mechanical fuse.

In some embodiments, the controller is further configured to apply the first electrical signal to the at least one first piezoelectric element to switch the at least one first piezoelectric element to the retained state. The controller is further configured to remove the first electrical signal from the at least one first piezoelectric element to switch the at least one first piezoelectric element to the released state.

In some embodiments, the clamp actuating unit further includes a first actuator configured to apply a first clamping force on the at least one first electromechanical transducer. In the retained state, the at least one first electromechanical transducer is configured to at least partially transmit the first clamping force received from the first actuator to the first clamp. The first actuator may apply the first clamping force on the at least one first electromechanical transducer to load the first clamp and hold the first clamp against the first loading bar.

In some embodiments, the clamp actuating unit further includes at least one first support member to support the at least one first electromechanical transducer between the first clamp and the first actuator. The at least one first support member is configured to receive the at least one first electromechanical transducer through the at least one first support member.

In some embodiments, the clamp actuating unit is further configured to selectively release the second clamp. The clamp actuating unit further includes at least one second electromechanical transducer switchable between a retained state and a released state. In the retained state, the at least one second electromechanical transducer is configured to load the second clamp, such that the second clamp holds the second loading bar against the second load. In the released state, the at least one second electromechanical transducer is configured to release the second clamp. The controller is further configured to electrically actuate the at least one second electromechanical transducer from the retained state to the released state to release the second clamp, such that the second loading bar applies the second loading wave to the test specimen.

Use of second clamp with the at least one second electromechanical transducer may allow precise control of the application of the second loading wave on the test specimen. Further, the release time of the at least one first electromechanical transducer may be synchronized with a release time of the at least one second electromechanical transducer.

In some embodiments, the second clamp includes a pair of second clamping members configured to hold the second loading bar therebetween. The at least one second electromechanical transducer includes a pair of second electromechanical transducers. Each second electromechanical transducer is configured to load a corresponding second clamping member from the pair of second clamping members. The pair of second electromechanical transducers may allow symmetric loading of the pair of second clamping members, thus eliminating any transverse bending forces on the second loading bar.

In some embodiments, the at least one second electromechanical transducer includes at least one second piezoelectric element configured to expand along a second transverse axis inclined to the longitudinal axis upon application of a second electrical signal. The at least one second piezoelectric element is further configured to contract along the second transverse axis upon removal of the electrical signal. In the retained state, the at least one second piezoelectric element expands to load the second clamp, and in the released state, the at least one second piezoelectric element contracts to release the second clamp. Use of the at least one second piezoelectric element may reduce the response time of the second clamp as compared to conventional clamps utilizing mechanical fuse.

In some embodiments, the controller is further configured to apply the second electrical signal to the at least one second piezoelectric element to switch the at least one second piezoelectric element to the retained state. The controller is further configured to remove the second electrical signal from the at least one second piezoelectric element to switch the at least one second piezoelectric element to the released state. The controller may independently control release of the first clamp and the second clamp using the first electrical signal and the second electrical signal, respectively.

In some embodiments, the clamp actuating unit further includes a second actuator configured to apply a second clamping force on the at least one second electromechanical transducer. In the retained state, the at least one second electromechanical transducer is configured to at least partially transmit the second clamping force received from the second actuator to the second clamp. The second actuator may apply the second clamping force on the at least one second electromechanical transducer to load the second clamp and hold the second clamp against the second loading bar.

In some embodiments, the clamp actuating unit further includes at least one second support member to support the at least one second electromechanical transducer between the second clamp and the second actuator. The at least one second support member is configured to receive the at least one second electromechanical transducer through the at least one second support member.

In some embodiments, the first loading unit is further configured to apply a static torque on the first loading bar, such that the first load is the static torque. In some embodiments, the second loading unit is further configured to apply a static axial force on the second loading bar, such that the second load is the static axial force. In some embodiments, the first loading wave is a torsion wave and the second loading wave is an axial wave. In some embodiments, the first clamp is configured to hold the first loading bar in torsion. In some embodiments, the second clamp is configured to hold the second loading bar in tension or compression.

According to a second aspect, there is provided a method for measuring loading on a test specimen. The method includes arranging a test specimen between a first loading bar and a second loading bar. The first and second loading bars are arranged along a longitudinal axis. The method further includes holding, via a first clamp, the first loading bar against a first load. Upon release of the first clamp, the first loading bar is configured to apply a first loading wave to the test specimen in response to the first load. The method further includes electrically actuating, via a controller, at least one first electromechanical transducer to a retained state. In the retained state, the at least one first electromechanical transducer loads the first clamp, such that the first clamp holds the first loading bar. The method further includes holding, via a second clamp, the second loading bar against a second load. Upon release of the second clamp, the second loading bar is configured to apply a second loading wave to the test specimen in response to the second load. The method further includes applying, via a first loading unit, the first load to the first loading bar. The method further includes applying, via a second loading unit, the second load to the second loading bar. The method further includes electrically actuating, via the controller, the at least one first electromechanical transducer from the retained state to a released state. In the released state, the at least one first electromechanical transducer releases the first clamp, such that the first loading bar applies the first loading wave to the test specimen.

In some embodiments, electrically actuating the at least one first electromechanical transducer to the retained state further includes applying a first electrical signal to the at least one first electromechanical transducer, such that the at least one first electromechanical transducer expands along a first transverse axis inclined to the longitudinal axis to load the first clamp. In some embodiments, electrically actuating the at least one first electromechanical transducer from the retained state to the released state further includes removing the first electrical signal from the at least one first electromechanical transducer, such that the at least one first electromechanical transducer contracts along the first transverse axis to release the first clamp.

In some embodiments, the method further includes applying, via a first actuator, a first clamping force on the at least one first electromechanical transducer. In the retained state, the at least one first electromechanical transducer is configured to at least partially transmit the first clamping force received from the first actuator to the first clamp.

In some embodiments, the method further includes electrically actuating, via the controller, at least one second electromechanical transducer to a retained state. In the retained state, the at least one second electromechanical transducer loads the second clamp, such that the second clamp holds the second loading bar. In some embodiments, the method further includes electrically actuating, via the controller, the at least one second electromechanical transducer from the retained state to a released state. In the released state, the at least one second electromechanical transducer releases the second clamp, such that the second loading bar applies the second loading wave to the test specimen.

In some embodiments, electrically actuating the at least one second electromechanical transducer to the retained state further includes applying a second electrical signal to the at least one second electromechanical transducer, such that the at least one second electromechanical transducer expands along a second transverse axis inclined to the longitudinal axis to load the second clamp. In some embodiments, electrically actuating the at least one second electromechanical transducer from the retained state to the released state further includes removing the second electrical signal from the at least one second electromechanical transducer, such that the at least one second electromechanical transducer contracts along the second transverse axis to release the second clamp.

In some embodiments, the method further includes applying, via a second actuator, a second clamping force on the at least one second electromechanical transducer. In the retained state, the at least one second electromechanical transducer is configured to at least partially transmit the second clamping force received from the second actuator to the second clamp.

In some embodiments, the method further includes simultaneously or timely sequentially releasing the first clamp and the second clamp.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIGS. 5A and 5B illustrate schematic side views of the clamp actuating unit and the first clamp of FIG. 4 in a retained state and a released state, respectively, of at least one first electromechanical transducer, according to an embodiment of the present disclosure;

FIGS. 7A and 7B illustrate schematic side views of the clamp actuating unit and the second clamp of FIG. 6 in a retained state and a released state, respectively, of at least one second electromechanical transducer, according to an embodiment of the present disclosure.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
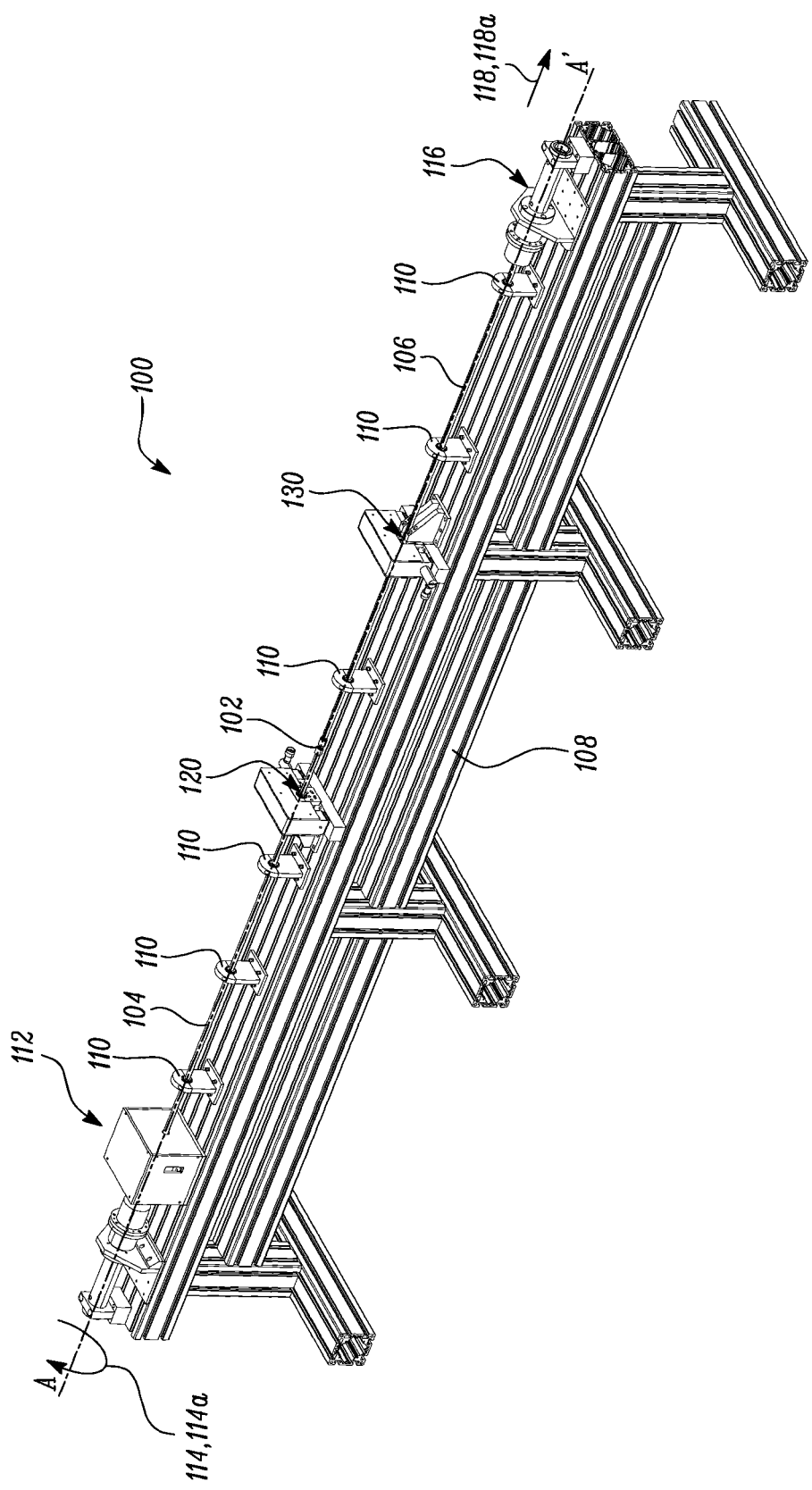
FIG. 1 is a schematic perspective view of a system for measuring loading on a test specimen, according to an embodiment of the present disclosure.

FIG. 1 illustrates a schematic perspective view of a system 100 for measuring loading on a test specimen 102. In some embodiments, the system 100 is a split-Hopkinson bar (SHPB) apparatus that enables a high strain rate application of combined torsional loading and axial loading on the test specimen 102. In other words, the system 100 may be used for measuring torsional loading combined with axial loading on the test specimen 102. In some embodiments, the system 100 may be used to obtain a mechanical response of a material under high strain rate deformation. In some embodiments, the strain rates may be between approx. 100 $s^{-1}$ and 10,000 $s^{-1}$. A material model may then be built based on the mechanical response of the material.

The system 100 includes a first loading bar 104 and a second loading bar 106 arranged along a longitudinal axis A-A'. The longitudinal axis A-A' may extend along a longitudinal direction of the system 100. In some embodiments, the first loading bar 104 and the second loading bar 106 are arranged in a straight line along the longitudinal axis A-A'. The test specimen 102 is arranged between the first and second loading bars 104, 106 along the longitudinal axis A-A'.

A stress wave (compression, tension, or torsion) may be introduced into one of the first loading bar 104 and the second loading bar 106, which transmits the stress wave to the test specimen 102. This causes the test specimen 102 to deform. A change in impedance between the first and second loading bars 104, 106 and the test specimen 102 causes a portion of the stress wave to be reflected, and the rest to be transmitted into a subsequent rod. By measuring the three stress waves (incident, transmitted, and reflected), a stress-strain response of the test specimen 102 can be inferred.

In some embodiments, the first and second loading bars 104, 106 may be solid cylindrical bars. In alternative embodiments, the first and second loading bars 104, 106 may have a non-circular cross-section, for example, polygonal, elliptical, or oval. A size of each of the first and second loading bars 104, 106 may be selected based on various factors, such as a duration of an event during testing and a size of the test specimen 102. In some embodiments, a length of the first loading bar 104 may be different from a length of the second loading bar 106. In some embodiments, the first and second loading bars 104, 106 may be constructed from any suitable material, such as, for example, metal or metal alloys (e.g., titanium alloy, high strength steel, phosphor bronze, etc.), plastic, elastomer, or composite material. In some embodiments, the first and second loading bars 104, 106 are made of same material and include same cross-sectional area. In some embodiments, the first and second loading bars 104, 106 may be elastic.

The system 100 further includes a first loading unit 112 coupled to the first loading bar 104 and configured to apply a first load 114 to the first loading bar 104. In some embodiments, the first loading unit 112 may be coupled to the first loading bar 104 though any suitable coupling mechanisms. In some embodiments, the first loading unit 112 is arranged to apply the first load 114 at an end of the first loading bar 104 opposite to the end where the test specimen 102 is secured. In some embodiments, the first loading unit 112 is further configured to apply a static torque 114$a$ on the first loading bar 104, such that the first load 114 is the static torque 114$a$. In some embodiments, the first loading unit 112 may include a torque pump configured to apply the first load 114 on the first loading bar 104. In some embodiments, impact devices may also be used to apply the first load 114.

The system 100 further includes a second loading unit 116 coupled to the second loading bar 106 and configured to apply a second load 118 to the second loading bar 106. In some embodiments, the second loading unit 116 may be arranged to apply the second load 118 at an end of the second loading bar 106 opposite to the end where the test specimen 102 is secured. In some embodiments, the second loading unit 116 is further configured to apply a static axial force 118$a$ on the second loading bar 106, such that the second load 118 is the static axial force 118$a$. In some embodiments, the first loading unit 112 and the second loading unit 116 may be controlled independently to apply the first load 114 and the second load 118, respectively. In some embodiments, the second loading unit 116 may include either energy storage (e.g., by holding a bar in tension) or impact devices configured to apply the second load 118 or the static axial force 118$a$ on the second loading bar 106.

In some embodiments, the first loading unit 112 and the second loading unit 116 may be configured to apply the first load 114 and the second load 118 on either the first loading bar 104 or the second loading bar 106. Thus, the first and second loading units 112, 116 may be mounted on one side of the SHPB only.

In some embodiments, the first and second loading units 112, 116 are mounted on a frame 108. The frame 108 may provide structural support to the system 100. Further, the first and second loading bars 104, 106 may be coupled to the frame 108 through one or more supporting members 110. In some embodiments, the first and second loading bars 104, 106 may pass through the one or more supporting members 110 for support.

In some embodiments, each supporting member 110 may allow movement of the first and second loading bars 104, 106 therethrough. In some embodiments, the one or more supporting members 110 may be low friction supports that allow near frictionless movement of the first and second loading bars 104, 106 through the one or more supporting members 110. It should be understood that the system 100 may include any number of supporting members 110. Further, the shape and configuration of the one or more supporting members 110 may vary based on a geometric shape and design of the first and second loading bars 104, 106. Additionally, some of the supporting members 110 may be different from the other supporting members 110. The relative positioning of the one or more supporting members 110 may be selected based on the length of the first and second loading bars 104, 106. Further, the one or more supporting members 110 may be movable along the longitudinal axis A-A' with respect to the frame 108.

The system 100 further includes a first clamp 120 disposed between the first loading unit 112 and the test specimen 102 along the longitudinal axis A-A'. The first clamp 120 is configured to hold the first loading bar 104 against the first load 114. In some embodiments, the first clamp 120 may be arranged and secured to the frame 108 at a location between the first loading unit 112 and the test specimen 102. The first clamp 120 may hold the first loading bar 104 such that when the first loading unit 112 applies the first load 114 to the first loading bar 104, the first load 114 is not transferred to the test specimen 102. A clamping force applied by the first clamp 120 may be sufficient to hold the first loading bar 104 against the first load 114. In some embodiments, the first clamp 120 is configured to hold the first loading bar 104 in torsion.

The system 100 further includes a second clamp 130 (shown partially) disposed between the second loading unit 116 and the test specimen 102 along the longitudinal axis A-A'. The second clamp 130 is configured to hold the second loading bar 106 against the second load 118. The second clamp 130 may be arranged and secured to the frame 108 at a location between the second loading unit 116 and the test specimen 102. The second clamp 130 may hold the second loading bar 106 such that when the second load unit 116 applies the second load 118 to the second loading bar 106, the second load 118 is not transferred to the test specimen 102. In other words, a clamping force applied by the second clamp 130 may be sufficient to hold the second loading bar 106 against the second load 118. In some embodiments, the second clamp 130 is configured to hold the second loading bar 106 in tension. In some embodiments, the second clamp 130 may be similar to the first clamp 120.

Figure 2:
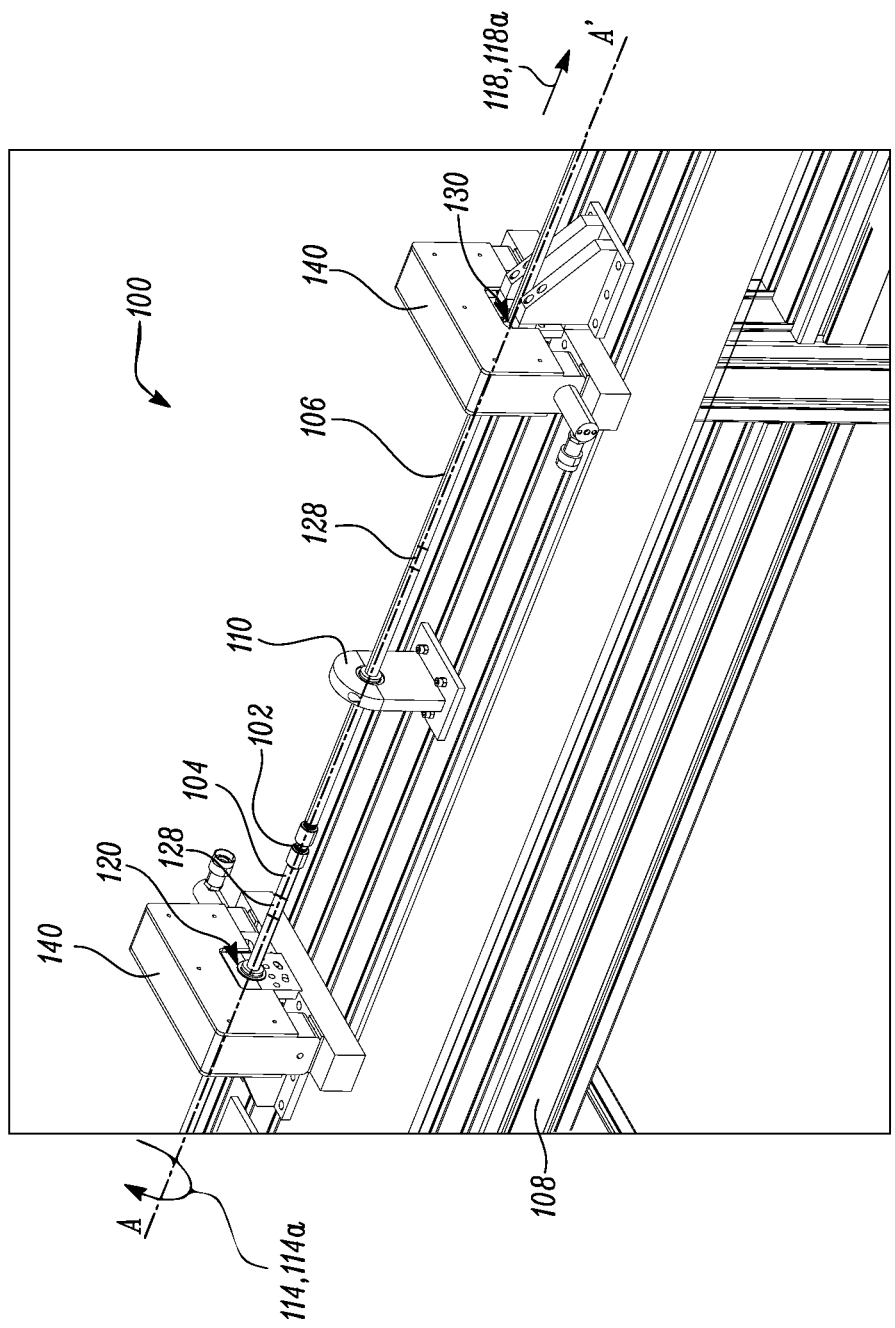
FIG. 2 is an enlarged schematic perspective view of the system of FIG. 1, according to an embodiment of the present disclosure.

FIG. 2 illustrates an enlarged schematic perspective view of the system 100. In some embodiments, the first load 114 or the static torque 114$a$ may be stored by means of the first clamp 120 holding the first loading bar 104 until the first load 114 or the static torque 114$a$ needs to be released. Thus, a stress-wave can be introduced into the first loading bar 104 by rapid release of the first load 114 or the static torque 114$a$ stored with the first clamp 120 remote from the test specimen 102. The system 100 further includes a clamp actuating unit 140 configured to selectively release at least the first clamp 120.

In some embodiments, the second load 118 or the static axial force 118*a* can be stored by means of the second clamp 130 holding the second loading bar 106 until the second load 118 or the static axial force 118*a* needs to be released. Thus, a stress-wave can be introduced into the second loading bar 106 by rapid release of the second load 118 or the static axial force 118*a* stored with the second clamp 130 remote from the test specimen 102. In some embodiments, the clamp actuating unit 140 is further configured to selectively release the second clamp 130. Specifically, the clamp actuating unit 140 is configured to release the first clamp 120 and the second clamp 130.

In some embodiments, one or more strain gauges 128 are suitably positioned on the first loading bar 104 and the second loading bar 106. In some embodiments, the one or more strain gauges 128 may measure shear and axial strains in the first and second loading bars 104, 106. In some embodiments, the one or more strain gauges 128 may be fixed to a surface of the first and second loading bars 104, 106. In some embodiments, the strains in the first and second loading bars 104, 106 may be determined from a surface velocity of the first and second loading bars 104, 106 measured using Photon Doppler Velocimetry (PDV) or Laser Doppler Velocimetry (LDV). In some embodiments, measurement of a deformation of the test specimen 102 may also be made using lasers, high speed photography or strain gauges. Measurements of force at a bar-specimen interface may be made using stress gauges.

Figure 3:
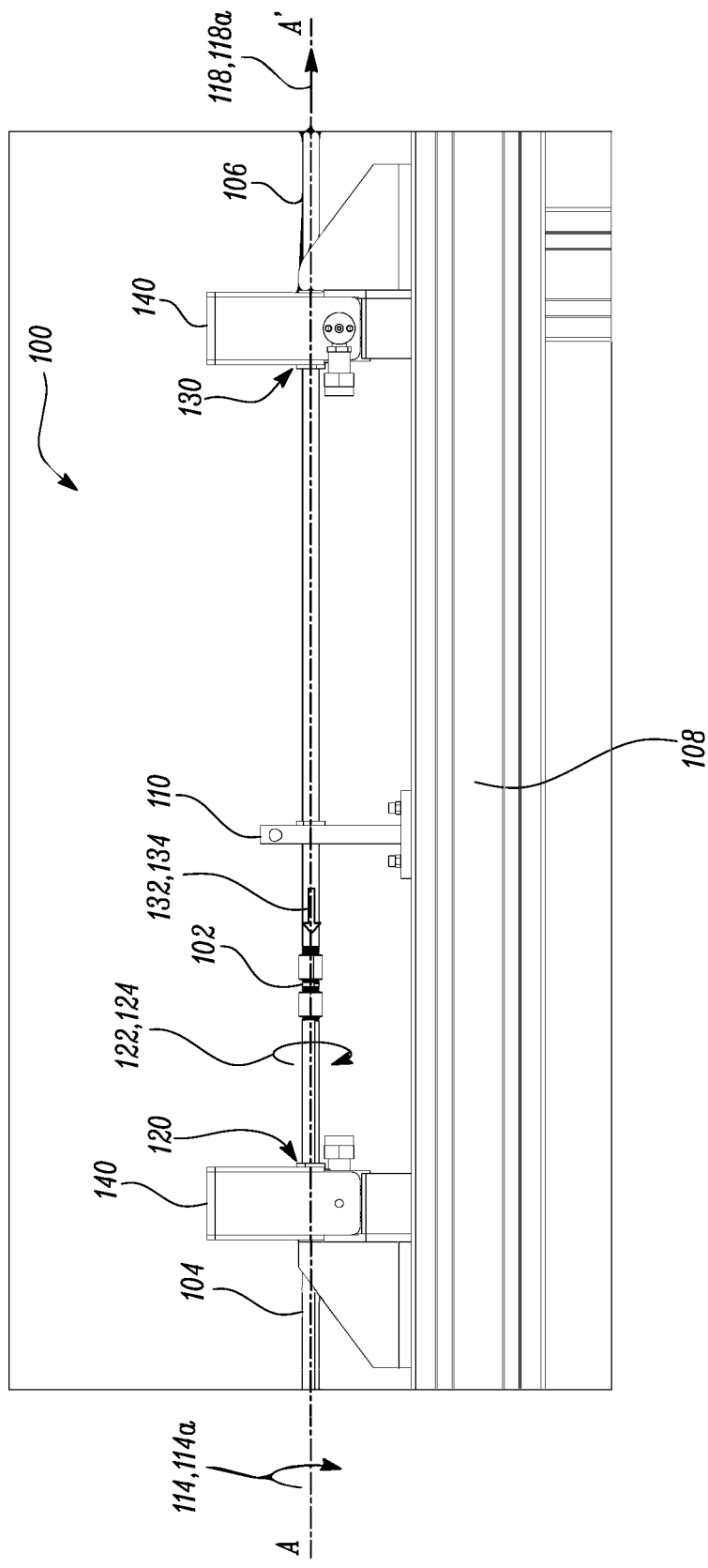
FIG. 3 is an enlarged schematic side view of the system of FIG. 1, according to an embodiment of the present disclosure.

FIG. 3 illustrates an enlarged schematic side view of the system 100 of FIG. 2. Upon release of the first clamp 120, the first loading bar 104 is configured to apply a first loading wave 122 to the test specimen 102 in response to the first load 114. Thus, upon release of the first clamp 120, the first loading wave 122 may reach the test specimen 102. In some embodiments, the first loading wave 122 is a torsion wave 124.

Upon release of the second clamp 130, the second loading bar 106 is configured to apply a second loading wave 132 to the test specimen 102 in response to the second load 118. Therefore, upon release of the second clamp 130, the second loading wave 132 may reach the test specimen 102. In some embodiments, the second loading wave 132 is an axial wave 134.

When the first clamp 120 is released, the first loading wave 122 travels along the first loading bar 104 and is applied to the test specimen 102. Likewise, when the second clamp 130 is released, the second loading wave 132 travels along the second loading bar 106 and is applied to the test specimen 102. Such an arrangement may allow a combination of torsional loading and axial loading (i.e., compression or tension) to be applied to the test specimen 102 at very high strain rates. Thus, a response to such combined loading of the test specimen 102 can be investigated. In some embodiments, the clamp actuating unit 140 may independently control the first clamp 120 and the second clamp 130 for applying the first loading wave 122 and the second loading wave 132 to the test specimen 102, respectively.

In some embodiments, the clamp actuating unit 140 may be configured to release the first and second clamps 120, 130 simultaneously. In such an arrangement (shown in FIGS. 1-3), the first and second clamps 120, 130 may be suitably positioned along the longitudinal axis A-A' such that the first and second loading waves 122, 132 may arrive at the test specimen 102 simultaneously. Since first loading wave 122 (e.g., torsion wave 124) may travel slower than the second loading wave 132 (e.g., axial wave 134), the second clamp 130 may be positioned further from the test specimen 102 that the first clamp 120. A distance between each of the first and second clamps 120, 130 and the test specimen 102 may be chosen so as to control a timing of arrival of the first and second loading waves 122, 132 at the test specimen 102. A position of the first and second clamps 120, 130 along the longitudinal axis A-A' may be determined previously based on calculations and experimental data.

In some embodiments, the clamp actuating unit 140 may be configured to release the first and second clamps 120, 130 in a timely sequential manner. For example, the clamp actuating unit 140 may release the second clamp 130 after releasing the first clamp 120 with a predetermined time delay. In such an arrangement, the first and second clamps 120, 130 may be positioned at equal distance from the test specimen 102. A time of releasing of the first clamp 120 and a time of releasing of the second clamp 116 may be determined previously based on calculations and experimental data to allow the first and second loading waves 122, 132 to reach the test specimen 102 simultaneously.

In some embodiments, the positions of the first and second clamps 120, 130 and the times of releasing of the first and second clamps 120, 130 may both be controlled to allow the first and second loading waves 122, 132 to reach the test specimen 102 simultaneously. In some other embodiments, the positions and/or the times of releasing of the first and second clamps 120, 130 may be chosen such that the first and second loading waves 122, 132 arrive at the test specimen 102 at different points in time. Based on the desired time of arrival of each of the first and second loading waves 122, 132 at the test specimen 102 and a speed of travel of each of the first and second loading waves 122, 132 through the first and second loading bars 104, 106, the respective distances of the first and second clamps 120, 130 from the test specimen 102 may be chosen.

In the illustrated embodiments of FIGS. 1-3, the system 100 is used for measuring combined torsional and tensile loading on the test specimen 102. However, in some embodiments, the system 100 may also be adapted for measuring combined torsional and compression loading on the test specimen 102. In such embodiments, the second loading unit 116 may be configured to apply a compression load on the test specimen 102. Thus, a compression stress-wave may be introduced into the second loading bar 106 by the second loading unit 116. For compression loading, the second loading unit 116 may include a striker bar, impacted into the second loading bar 106 by, for example, a gas gun. Further, the second clamp 130 may be configured to hold the second loading bar 106 in compression.

It will be appreciated that other arrangements are possible where the first and second loading units 112, 116 are both axial force systems (i.e., arranged to apply a static axial force to the first and second respective loading bars 104, 106), or are both torsional force systems (i.e., arranged to apply a static torque to the first and second respective loading bars 104, 106). Further, in arrangements where the first and second loading units 112, 116 are both axial force systems, one loading unit may provide a tension force and the other may provide a compression force, or both loading units may provide the same type of force (i.e., tension or compression). Additionally, in arrangements where the first and second loading units 112, 116 are both torsional force systems, the directions of the torsional forces may be same or opposite to each other.

Figure 4:
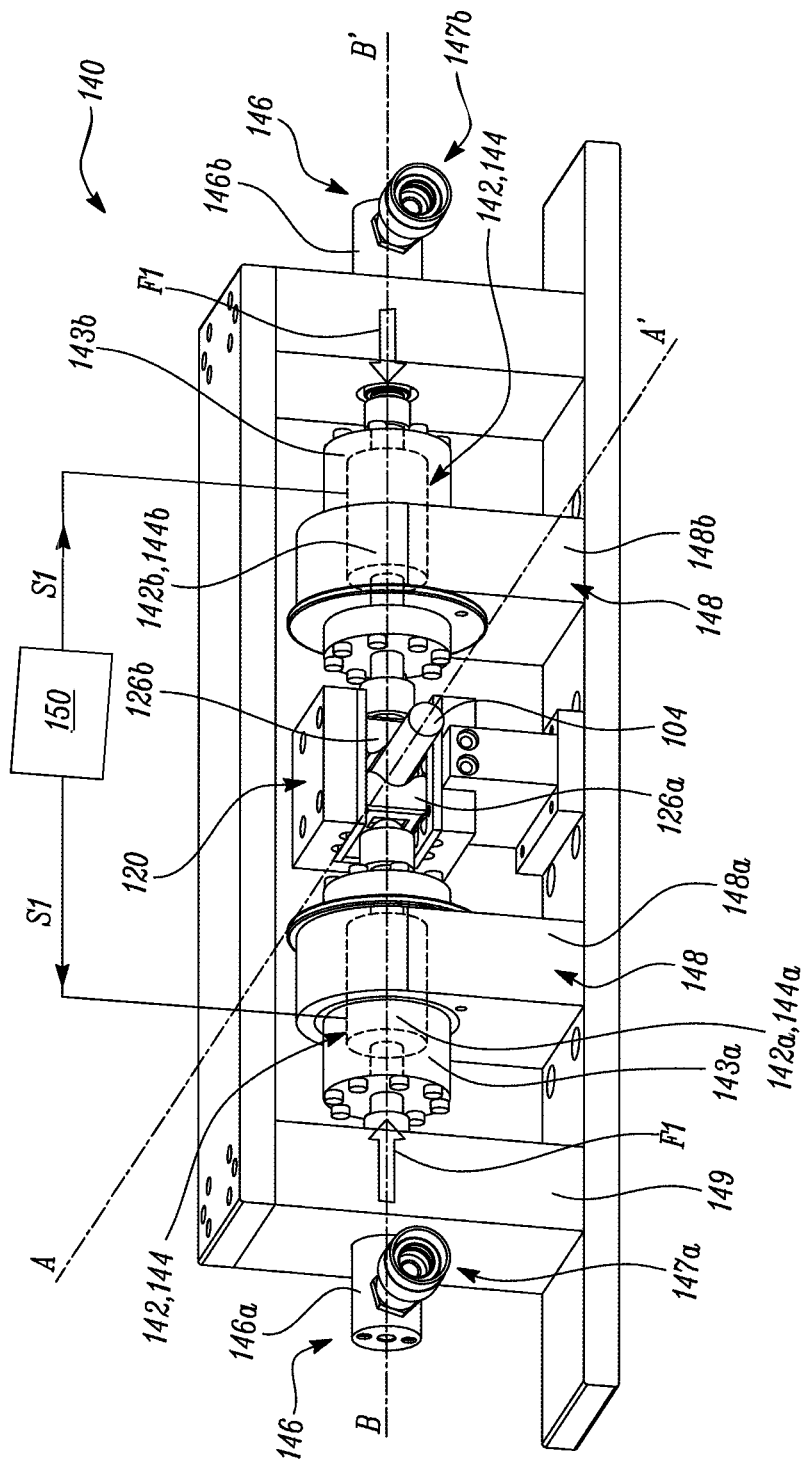
FIG. 4 is a schematic perspective view of a clamp actuating unit and a first clamp, according to an embodiment of the present disclosure.

FIG. 4 illustrates a schematic perspective view of the clamp actuating unit 140 and the first clamp 120. An outer housing of the clamp actuating unit 140 may be omitted in FIG. 4 for the purpose of illustration. The clamp actuating unit 140 includes at least one first electromechanical transducer 142 switchable between a retained state P1 (shown in FIG. 5A) and a released state P2 (shown in FIG. 5B). The at least one first electromechanical transducer 142 may be any type of electromechanical transducer operable to convert electrical energy to mechanical energy (e.g., a piezoelectric device). In some embodiments, the at least one first electromechanical transducer 142 includes a pair of first electromechanical transducers 142a, 142b such that both the first electromechanical transducers 142a, 142b are switchable between the retained state P1 and the released state P2.

The first clamp 120 includes a pair of first clamping members 126a, 126b configured to hold the first loading bar 104 therebetween. In some embodiments, each first electromechanical transducer 142a, 142b is configured to load a corresponding first clamping member 126a, 126b from the pair of first clamping members 126a, 126b to hold the first loading bar 104 therebetween. In other words, the first electromechanical transducer 142a is configured to load the first clamping member 126a and the first electromechanical transducer 142b is configured to load the first clamping member 126b to hold the first loading bar 104 between the pair of first clamping members 126a, 126b.

In some embodiments, the at least one first electromechanical transducer 142 includes at least one first piezoelectric element 144 configured to expand along a first transverse axis B-B' inclined to the longitudinal axis A-A' upon application of a first electrical signal S1. In some embodiments, the at least one first piezoelectric element 144 includes a pair of first piezoelectric elements 144a, 144b. The pair of first piezoelectric elements 144a, 144b are enclosed within a corresponding first housing 143a, 143b.

The clamp actuating unit 140 further includes a controller 150 configured to electrically actuate the at least one first electromechanical transducer 142. In some embodiments, the controller 150 may be embodied in a number of different ways. For example, the controller 150 may be embodied as various processing means, such as one or more of a microprocessor or other processing elements, a coprocessor, or various other computing or processing devices including integrated circuits, such as, for example, an ASIC (application specific integrated circuit), or the like. In some embodiments, the controller 150 may be configured to execute instructions stored in a memory provided with the controller 150 or otherwise accessible to the controller 150.

As such, whether configured by hardware or by a combination of hardware and software, the controller 150 may represent an entity (e.g., physically embodied in circuitry—in the form of processing circuitry) capable of performing operations according to some embodiments while configured accordingly. Thus, for example, when the controller 150 is embodied as an ASIC, FPGA or the like, the controller 150 may have specifically configured hardware for conducting the operations described herein. Alternatively, as another example, when the controller 150 is embodied as an executor of software instructions, the instructions may specifically configure the controller 150 to perform the operations described herein.

In some embodiments, the controller 150 is electrically coupled to the at least one first electromechanical transducer 142 (or the at least one first piezoelectric element 144). In some embodiments, the controller 150 is configured to provide one or more electrical signals to the at least one first electromechanical transducer 142 (or the at least one first piezoelectric element 144). In some examples, the one or more electrical signals may be in the form of a positive voltage applied across the at least one first piezoelectric element 144.

In some embodiments, the controller 150 provides the first electrical signal S1 to each of the first piezoelectric elements 144a, 144b. Correspondingly, the first piezoelectric elements 144a, 144b may expand along the first transverse axis B-B'. Further, the first electromechanical transducers 142a, 142b (or the first piezoelectric elements 144a, 144b) are configured to expand along the first transverse axis B-B' to load the corresponding first clamping members 126a, 126b upon application of the first electrical signal S1 by the controller 150. In some embodiments, the at least one first piezoelectric element 144 may further be configured to contract along the first transverse axis B-B' upon removal of the first electrical signal S1.

In some embodiments, the first transverse axis B-B' is orthogonal to the longitudinal axis A-A'. In some other embodiments, the first transverse axis B-B' is inclined at an oblique angle with respect to the longitudinal axis A-A'.

In some embodiments, the clamp actuating unit 140 further includes a first actuator 146 configured to apply a first clamping force F1 on the at least one first electromechanical transducer 142. In some embodiments, the clamp actuating unit 140 includes a pair of first actuators 146a, 146b configured to apply the first clamping force F1 on the corresponding first electromechanical transducer 142a, 142b. In other words, the first actuator 146a is configured to apply the first clamping force F1 on the first electromechanical transducer 142a and the first actuator 146b is configured to apply the first clamping force F1 on the first electromechanical transducer 142b.

In some embodiments, the first actuators 146a, 146b may include a hydraulic ram configured to receive a hydraulic pressure from a suitable pressure source (not shown) though corresponding inlets 147a, 147b. In some embodiments, the first actuators 146a, 146b may be supported along the first transverse axis B-B' by a frame 149 of the clamp actuating unit 140 such that the first clamping force F1 applied by the first actuators 146a, 146b is along the first transverse axis B-B'.

In some embodiments, the clamp actuating unit 140 further includes at least one first support member 148 to support the at least one first electromechanical transducer 142 between the first clamp 120 and the first actuator 146. In some embodiments, the at least one first support member 148 is configured to receive the at least one first electromechanical transducer 142 through the at least one first support member 148. In some embodiments, the at least one first support member 148 supports the at least one first electromechanical transducer 142 such that the first support member 148 allows the first electromechanical transducer 142 (or the first piezoelectric element 144) to expand or contract along the first transverse axis B-B'.

In some embodiments, the clamp actuating unit 140 includes a pair of first support members 148a, 148b corresponding to the pair of first electromechanical transducers 142a, 142b. In other words, the first support member 148a is configured to receive the first electromechanical transducers 142a through the at least one first support member 148a and the first support member 148b is configured to receive the first electromechanical transducers 142b through the at least one first support member 148b.

FIGS. 5A and 5B illustrate schematic side views of the clamp actuating unit 140 and the first clamp 120 in the retained state P1 and the released state P2 of the first electromechanical transducer 142, respectively. Referring now to FIG. 5A, in the retained state P1, the at least one first electromechanical transducer 142 is configured to load the first clamp 120, such that the first clamp 120 holds the first loading bar 104 against the first load 114. Specifically, the first electromechanical transducer 142a is configured to load the first clamping member 126a and the first electromechanical transducer 142b is configured to load the first clamping member 126b such that the first clamping members 126a, 126b hold the first loading bar 104 therebetween.

In some embodiments, in the retained state P1, the at least one first piezoelectric element 144 expands to load the first clamp 120. FIG. 5A illustrates the at least one first piezoelectric element 144 in an expanded state of the at least one first piezoelectric element 144. For example, the at least one first piezoelectric element 144 has a length L1 in the expanded state. Specifically, the first piezoelectric element 144a expands along the first transverse axis B-B' to load the first clamping member 126a and the first piezoelectric element 144b expands along the first transverse axis B-B' to load the first clamping member 126b. In some embodiments, the controller 150 is further configured to apply the first electrical signal S1 to the at least one first piezoelectric element 144 to switch the at least one first piezoelectric element 144 to the retained state P1. Specifically, each of the first piezoelectric elements 144a, 144b may expand along the first transverse axis B-B' when the first electrical signal S1 is applied to the first piezoelectric elements 144a, 144b.

In some embodiments, in the retained state P1, the at least one first electromechanical transducer 142 is configured to at least partially transmit the first clamping force F1 received from the first actuator 146 to the first clamp 120. Specifically, the first electromechanical transducer 142a is configured to at least partially transmit the first clamping force F1 received from the first actuator 146a to the first clamping member 126a. Likewise, the first electromechanical transducer 142b is configured to at least partially transmit the first clamping force F1 received from the first actuator 146b to the first clamping member 126b. Therefore, the loads applied by the first electromechanical transducers 142a, 142b based on the expansion of the first piezoelectric elements 144a, 144b, and the first clamping force F1 are configured to hold the first loading bar 104 against the first load 114.

Referring now to FIG. 5B, in the released state P2, the at least one first electromechanical transducer 142 is configured to release the first clamp 120. In some embodiments, the controller 150 is configured to electrically actuate the at least one first electromechanical transducer 142 from the retained state P1 to the released state P2 to release the first clamp 120.

In some embodiments, in the released state P2, the at least one first piezoelectric element 144 contracts to release the first clamp 120. FIG. 5B illustrates the at least one first piezoelectric element 144 in a contracted state of the at least one first piezoelectric element 144. For example, the at least one first piezoelectric element 144 has a length L2 in the contracted state such that the length L2 is smaller than the length L1 (i.e., L2<L1). Further, the first piezoelectric elements 144a, 144b contract along the first transverse axis B-B' to release the first clamp 120. In some embodiments, the controller 150 is further configured to remove the first electrical signal S1 from the at least one first piezoelectric element 144 to switch the at least one first piezoelectric element 144 to the released state P2. In other words, the controller 150 is further configured to remove the first electrical signal S1 from the first piezoelectric elements 144a, 144b to switch the first piezoelectric elements 144a, 144b to the released state P2. Specifically, each of the first piezoelectric elements 144a, 144b may resume initial shape when the first electrical signal S1 is removed from the first piezoelectric elements 144a, 144b.

In the illustrated embodiment of FIG. 5B, a movement of the first clamping members 126a, 126b and the contraction of the first piezoelectric elements 144a, 144b are shown magnified for the purpose of illustration, and the actual movement of the first clamping members 126a, 126b and the contraction of the first piezoelectric elements 144a, 144b may vary based on actual usage requirements.

Additionally, in some embodiments, in the released state P2, the at least one first electromechanical transducer 142 is configured to remove the first clamping force F1 from the first clamp 120. Specifically, the first electromechanical transducers 142a, 142b are configured to remove the first clamping force F1 from the first clamping members 126a, 126b. The controller 150 is configured to electrically actuate the at least one first electromechanical transducer 142 from the retained state P1 to the released state P2 to release the first clamp 120, such that the first loading bar 104 applies the first loading wave 122 (shown in FIG. 3) to the test specimen 102.

Figure 6:
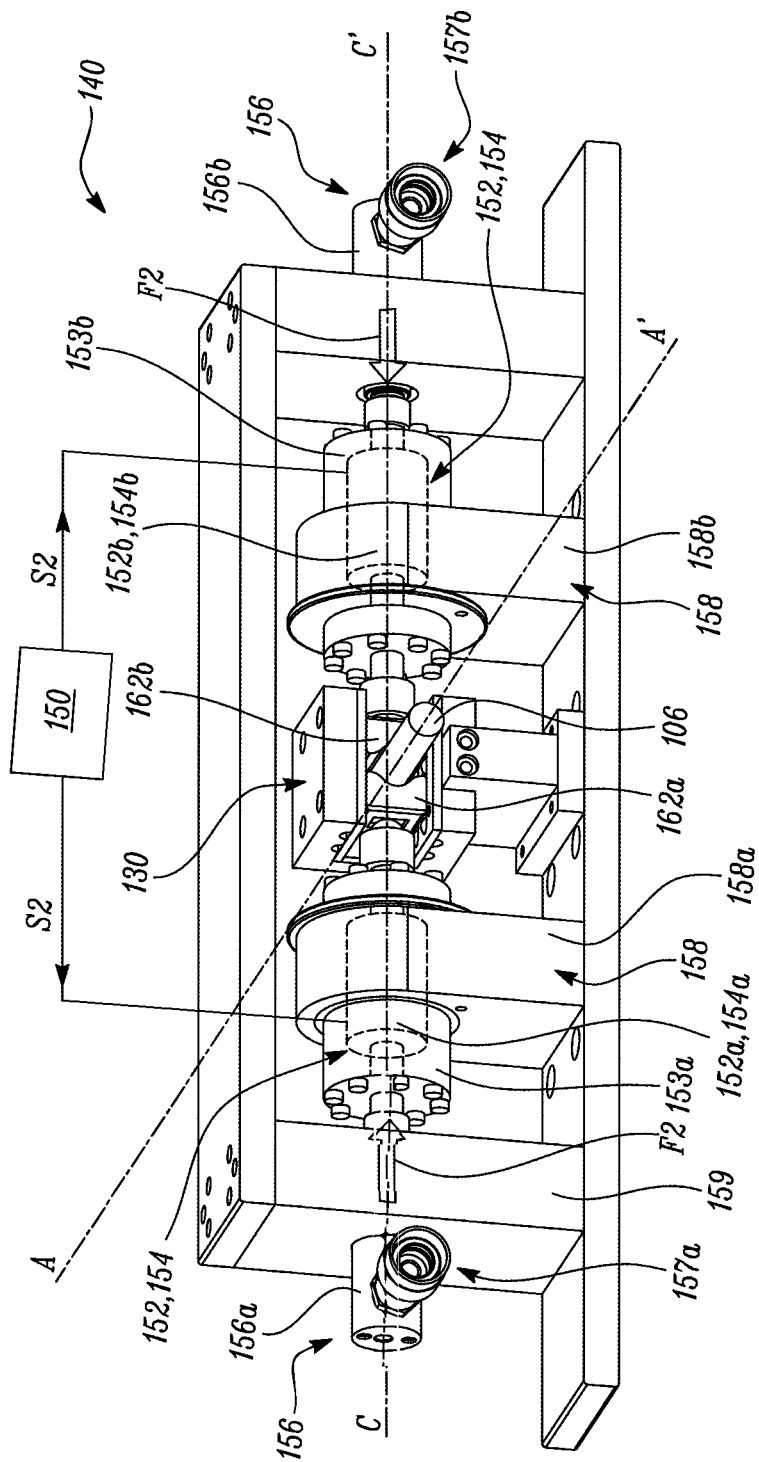
FIG. 6 is a schematic perspective view of the clamp actuating unit and a second clamp, according to an embodiment of the present disclosure.

FIG. 6 illustrates a schematic perspective view of the clamp actuating unit 140 and the second clamp 130. An outer housing of the clamp actuating unit 140 is omitted in FIG. 6 for the purpose of illustration. The clamp actuating unit 140 further includes at least one second electromechanical transducer 152 switchable between a retained state Q1 (shown in FIG. 7A) and a released state Q2 (shown in FIG. 7B). The at least one second electromechanical transducer 152 may be any type of electromechanical transducer operable to convert electrical energy to mechanical energy (e.g., a piezoelectric device). In some embodiments, the at least one second electromechanical transducer 152 includes a pair of second electromechanical transducers 152a, 152b such that both the second electromechanical transducers 152a, 152b are switchable between the retained state Q1 and the released state Q2. In some embodiments, the at least one second electromechanical transducers 152 may be similar to the at least one first electromechanical transducer 142.

The second clamp 130 includes a pair of second clamping members 162a, 162b configured to hold the second loading bar 106 therebetween. In some embodiments, each second electromechanical transducer 152a, 152b is configured to load a corresponding second clamping member 162a, 162b from the pair of second clamping members 162a, 162b to hold the second loading bar 106 therebetween. In other words, the second electromechanical transducer 152a is configured to load the second clamping member 162a and the second electromechanical transducer 152b is configured to load the second clamping member 162b to hold the second loading bar 106 between the pair of second clamping members 162a, 162b.

In some embodiments, the at least one second electromechanical transducer 152 includes at least one second piezoelectric element 154 configured to expand along a second transverse axis C-C' inclined to the longitudinal axis A-A' upon application of a second electrical signal S2. In some embodiments, the at least one second piezoelectric element 154 includes a pair of second piezoelectric elements 154a, 154b. The pair of second piezoelectric elements 154a, 154b are enclosed within a corresponding second housing 153a, 153b.

The clamp actuating unit 140 further includes the controller 150 configured to electrically actuate the at least one second electromechanical transducer 152. In some embodiments, the controller 150 may provide the second electrical signal S2 to each of the second piezoelectric elements 154*a*, 154*b*. Correspondingly, the second piezoelectric elements 154*a*, 154*b* may expand along the second transverse axis C-C'. Further, the second electromechanical transducers 152*a*, 152*b* (or the second piezoelectric elements 154*a*, 154*b*) are configured to expand along the second transverse axis C-C' to load the corresponding second clamping members 162*a*, 162*b* upon application of the second electrical signal S2 by the controller 150. In some embodiments, the at least one second piezoelectric element 154 may further be configured to contract along the second transverse axis C-C' upon removal of the second electrical signal S2.

In some embodiments, the second transverse axis C-C' is orthogonal to the longitudinal axis A-A'. In some other embodiments, the second transverse axis C-C' is inclined at an oblique angle with respect to the longitudinal axis A-A'. In some embodiments, the second transverse axis C-C' may be parallel to the first transverse axis B-B' (shown in FIG. 4).

In some embodiments, the clamp actuating unit 140 further includes a second actuator 156 configured to apply a second clamping force F2 on the at least one second electromechanical transducer 152. In some embodiments, the clamp actuating unit 140 includes a pair of second actuators 156*a*, 156*b* configured to apply the second clamping force F2 on the corresponding second electromechanical transducers 152*a*, 152*b*. In other words, the second actuator 156*a* is configured to apply the second clamping force F2 on the second electromechanical transducer 152*a* and the second actuator 156*b* is configured to apply the second clamping force F2 on the second electromechanical transducer 152*b*.

In some embodiments, the at least one second actuator 156 may include a hydraulic ram configured to receive a hydraulic pressure from a suitable pressure source (not shown) though a corresponding inlet 157*a*, 157*b*. In some embodiments, the second actuators 156*a*, 156*b* may be supported along the second transverse axis C-C' by a frame 159 of the clamp actuating unit 140 such that the second clamping force F2 applied by the second actuators 156*a*, 156*b* is along the second transverse axis C-C'.

In some embodiments, the clamp actuating unit 140 further includes at least one second support member 158 to support the at least one second electromechanical transducer 152 between the second clamp 130 and the second actuator 156. In some embodiments, the at least one second support member 158 is configured to receive the at least one second electromechanical transducer 152 through the at least one second support member 158. In some embodiments, the at least one second support member 158 supports the at least one second electromechanical transducer 152 such that the second support member 158 allows the second electromechanical transducer 152 (or the second piezoelectric element 154) to expand or contract along the second transverse axis C-C'.

In some embodiments, the clamp actuating unit 140 includes a pair of second support members 158*a*, 158*b* corresponding to the pair of second electromechanical transducers 152*a*, 152*b*. In other words, the second support members 158*a* is configured to receive the second electromechanical transducer 152*a* through the at least one second support member 158*a* and the second support member 158*b* is configured to receive the second electromechanical transducers 152*b* through the at least one second support member 158*b*.

FIGS. 7A and 7B illustrate schematic side views of the clamp actuating unit 140 and the second clamp 130 in the retained state Q1 and the released state Q2 of the second electromechanical transducer 152, respectively. Referring now to FIG. 7A, in the retained state Q1, the at least one second electromechanical transducer 152 is configured to load the second clamp 130, such that the second clamp 130 holds the second loading bar 106 against the second load 118. Specifically, the second electromechanical transducer 152*a* is configured to load the second clamping member 162*a* and the second electromechanical transducer 152*b* is configured to load the second clamping member 162*b* such that the second clamping members 162*a*, 162*b* hold the second loading bar 106 therebetween.

In some embodiments, in the retained state Q1, the at least one second piezoelectric element 154 expands to load the second clamp 130. FIG. 7A illustrates the at least one second piezoelectric element 154 in an expanded state of the at least one second piezoelectric element 154. For example, the at least one second piezoelectric element 154 has a length M1 in the expanded state. Specifically, the second piezoelectric element 154*a* expands along the second transverse axis C-C' to load the second clamping member 162*a* and the second piezoelectric element 154*b* expands along the second transverse axis C-C' to load the second clamping member 162*b*. In some embodiments, the controller 150 is further configured to apply the second electrical signal S2 to the at least one second piezoelectric element 154 to switch the at least one second piezoelectric element 154 to the retained state Q1. Specifically, each of the second piezoelectric elements 154*a*, 154*b* may expand along the second transverse axis C-C' when the second electrical signal S2 is applied to the second piezoelectric elements 154*a*, 154*b*.

In some embodiments, in the retained state Q1, the at least one second electromechanical transducer 152 is configured to at least partially transmit the second clamping force F2 received from the second actuator 156 to the second clamp 130. Specifically, the second electromechanical transducer 152*a* is configured to at least partially transmit the second clamping force F2 received from the second actuator 156*a* to the second clamping member 162*a*. Likewise, the second electromechanical transducer 152*b* is configured to at least partially transmit the second clamping force F2 received from the second actuator 156*b* to the second clamping member 162*b*. Therefore, the loads applied by the second electromechanical transducers 152*a*, 152*b* based on the expansion of the second piezoelectric elements 154*a*, 154*b*, and the second clamping force F2 are configured to hold the second loading bar 106 against the second load 118.

Referring now to FIG. 7B, in the released state Q2, the at least one second electromechanical transducer 152 is configured to release the second clamp 130. In some embodiments, the controller 150 is configured to electrically actuate the at least one second electromechanical transducer 152 from the retained state Q1 to the released state Q2 to release the second clamp 130.

In some embodiments, in the released state Q2, the at least one second piezoelectric element 154 contracts to release the second clamp 130. FIG. 7B illustrates the at least one second piezoelectric element 154 in a contracted state of the at least one second piezoelectric element 154. For example, the at least one second piezoelectric element 154 has a length M2 in the contracted state such that the length M2 is smaller than the length M1 (i.e., M2<M1). Further, the second piezoelectric elements 154*a*, 154*b* contract along the second transverse axis C-C' to release the second clamp 130. In some embodiments, the controller 150 is further configured to remove the second electrical signal S2 from the at least one second piezoelectric element 154 to switch the at least one second piezoelectric element 154 to the released state Q2. In some embodiments, the controller 150 is further configured to remove the second electrical signal S2 from the second piezoelectric elements 154a, 154b to switch the second piezoelectric elements 154a, 154b to the released state Q2. Specifically, each of the second piezoelectric elements 154a, 154b may resume initial shape when the second electrical signal S2 is removed from the second piezoelectric elements 154a, 154b.

In the illustrated embodiment of FIG. 7B, a movement of the second clamping members 162a, 162b and the contraction of the second piezoelectric elements 152a, 152b are shown magnified for the purpose of illustration, and the actual movement of the second clamping members 162a, 162b and the contraction of the second piezoelectric elements 152a, 152b may vary based on actual usage requirements.

Additionally, in some embodiments, in the released state Q2, the at least one second electromechanical transducer 152 is configured to remove the second clamping force F2 from the second clamp 130. Specifically, the second electromechanical transducers 152a, 152b are configured to remove the second clamping force F2 from the second clamping members 162a, 162b. The controller 150 is configured to electrically actuate the at least one second electromechanical transducer 152 from the retained state Q1 to the released state Q2 to release the second clamp 130, such that the second loading bar 106 applies the second loading wave 132 (shown in FIG. 3) to the test specimen 102.

Referring now to FIGS. 1-7B, when measuring loading on the test specimen 102, the first loading unit 112 is configured to apply the first load 114 (e.g., the static torque 114a) on the first loading bar 104. The first clamp 120 is configured to hold the first loading bar 104 against the first load 114 as the at least one first electromechanical transducer 142 is in the retained state P1. In the retained state P1, the controller 150 is configured to apply the first electrical signal S1 to the at least one first piezoelectric element 144 (or the at least one first electromechanical transducer 142) such that the at least one first piezoelectric element 144 expands along the first transverse axis B-B' to load the first clamp 120, and thus, hold the first loading bar 104. Further, the at least one first electromechanical transducer 142 is configured to at least partially transmit the first clamping force F1 received from the first actuator 146 to the first clamp 120.

Likewise, the second loading unit 116 is configured to apply the second load 118 (e.g., the static axial force 118a) on the second loading bar 106. The second clamp 130 is configured to hold the second loading bar 106 against the second load 118 as the at least one second electromechanical transducer 152 is in the retained state Q1. In the retained state Q1, the controller 150 is configured to apply the second electrical signal S2 to the at least one second piezoelectric element 154 (or the at least one second electromechanical transducer 152) such that the at least one second piezoelectric element 154 expands along the second transverse axis C-C' to load the second clamp 130, and thus, hold the second loading bar 106. In the retained state Q1, the at least one second electromechanical transducer 152 is configured to at least partially transmit the second clamping force F2 received from the second actuator 156 to the second clamp 130.

When the first clamp 120 is to be released, the controller 150 is configured to remove the first electrical signal S1 from the at least one first piezoelectric element 144 (or the at least one first electromechanical transducer 142) to switch the at least one first piezoelectric element 144 to the released state P2. Thus, the at least one first piezoelectric element 144 contracts along the first transverse axis B-B' to release the first clamp 120 such that the first loading bar 104 applies the first loading wave 122 to the test specimen 102.

Likewise, when the second clamp 130 is to be released, the controller 150 is configured to remove the second electrical signal S2 from the at least one second piezoelectric element 154 (or the at least one second electromechanical transducer 152) to switch the at least one second piezoelectric element 154 to the released state Q2. Thus, the at least one second piezoelectric element 154 contracts along the second transverse axis C-C' to release the second clamp 130 such that the second loading bar 106 applies the second loading wave 132 to the test specimen 102. Loading on the test specimen 102 is initiated by releasing the first and second clamps 120, 130 at predetermined times.

Use of the at least one first electromechanical transducer 142 and the at least one second electromechanical transducer 152 may allow the clamp actuating unit 140 to precisely and accurately control release times of the first clamp 120 and the second clamp 130, respectively. This may help in controlling application of the first loading wave 122 and the second loading wave 132 on the test specimen 102 accurately. Further, first clamp 120 and second clamp 130 may be released quickly and reliably as compared to conventional clamps with mechanical fuse.

In some alternative embodiments, one of the first clamp 120 and the second clamp 130 may be loaded using a mechanical fuse (instead of electromechanical transducer) while the other may be loaded using the electromechanical transducer. In such embodiments, a release of the clamp loaded with the mechanical fuse may be configured to trigger a release of the clamp loaded with the electromechanical transducer to control the application of corresponding stress waves.

Figure 8:
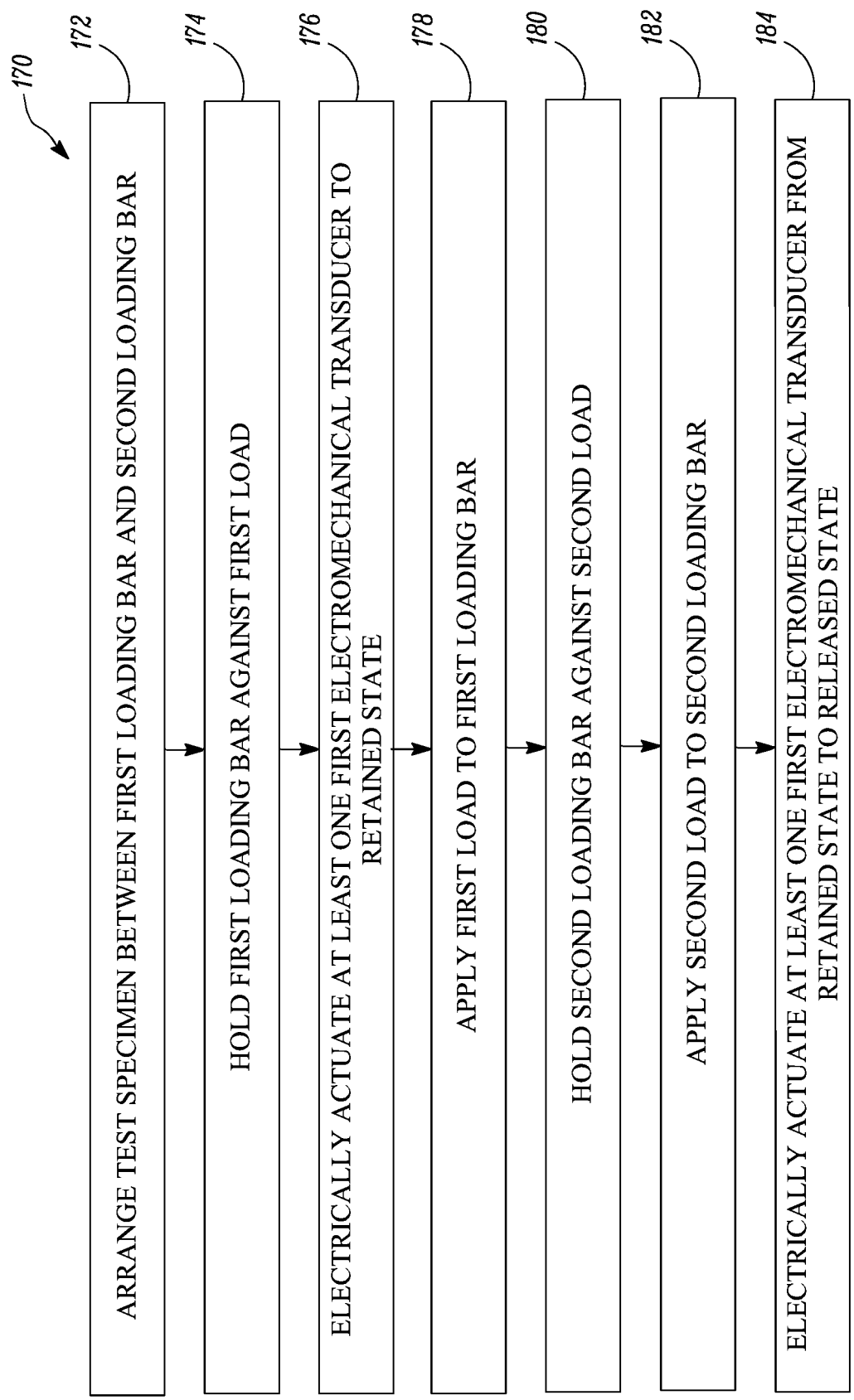
FIG. 8 illustrates a flow chart of a method for measuring loading on a test specimen, according to another embodiment of the present disclosure.

FIG. 8 illustrates a flow chart describing a method 170 for measuring loading on the test specimen 102. The method 170 may be implemented using the system 100 of FIGS. 1-7B incorporating the teachings of the present disclosure.

At step 172, the method 170 includes arranging the test specimen 102 between the first loading bar 104 and the second loading bar 106. The first and second loading bars 104, 106 are arranged along the longitudinal axis A-A'. At step 174, the method 170 further includes holding, via the first clamp 120, the first loading bar 104 against the first load 114. Upon release of the first clamp 120, the first loading bar 104 is configured to apply the first loading wave 122 to the test specimen 102 in response to the first load 114. At step 176, the method 170 further includes electrically actuating, via the controller 150, the at least one first electromechanical transducer 142 to the retained state P1. In the retained state P1, the at least one first electromechanical transducer 142 loads the first clamp 120, such that the first clamp 120 holds the first loading bar 104.

In some embodiments, electrically actuating the at least one first electromechanical transducer 142 to the retained state P1 further includes applying the first electrical signal S1 to the at least one first electromechanical transducer 142, such that the at least one first electromechanical transducer 142 expands along the first transverse axis B-B' inclined to the longitudinal axis A-A' to load the first clamp 120.

In some embodiments, the method 170 further includes applying, via the first actuator 146, the first clamping force F1 on the at least one first electromechanical transducer 142. In the retained state P1, the at least one first electromechanical transducer 142 is configured to at least partially transmit the first clamping force F1 received from the first actuator 146 to the first clamp 120.

At step 178, the method 170 further includes applying, via the first loading unit 112, the first load 114 to the first loading bar 104.

At step 180, the method 170 further includes holding, via the second clamp 130, the second loading bar 106 against the second load 118. Upon release of the second clamp 130, the second loading bar 106 is configured to apply the second loading wave 132 to the test specimen 102 in response to the second load 118.

In some embodiments, the method 170 further includes electrically actuating, via the controller 150, the at least one second electromechanical transducer 152 to the retained state Q1. In the retained state Q1, the at least one second electromechanical transducer 152 loads the second clamp 130, such that the second clamp 130 holds the second loading bar 106. In some embodiments, electrically actuating the at least one second electromechanical transducer 152 to the retained state Q1 further includes applying the second electrical signal S2 to the at least one second electromechanical transducer 152, such that the at least one second electromechanical transducer 152 expands along the second transverse axis C-C' inclined to the longitudinal axis A-A' to load the second clamp 130.

In some embodiments, the method 170 further includes applying, via the second actuator 156, the second clamping force F2 on the at least one second electromechanical transducer 152. In the retained state Q1, the at least one second electromechanical transducer 152 is configured to at least partially transmit the second clamping force F2 received from the second actuator 156 to the second clamp 130.

At step 182, the method 170 further includes applying, via the second loading unit 116, the second load 118 to the second loading bar 106.

At step 184, the method 170 further includes electrically actuating, via the controller 150, the at least one first electromechanical transducer 142 from the retained state P1 to the released state P2. In the released state P2, the at least one first electromechanical transducer 142 releases the first clamp 120, such that the first loading bar 104 applies the first loading wave 122 to the test specimen 102. In some embodiments, electrically actuating the at least one first electromechanical transducer 142 from the retained state P1 to the released state P2 further includes removing the first electrical signal S1 from the at least one first electromechanical transducer 142, such that the at least one first electromechanical transducer 142 contracts along the first transverse axis B-B' to release the first clamp 120.

In some embodiments, the method 170 further includes electrically actuating, via the controller 150, the at least one second electromechanical transducer 152 from the retained state Q1 to the released state Q2. In the released state Q2, the at least one second electromechanical transducer 152 releases the second clamp 130, such that the second loading bar 106 applies the second loading wave 132 to the test specimen 102. In some embodiments, electrically actuating the at least one second electromechanical transducer 152 from the retained state Q1 to the released state Q2 further includes removing the second electrical signal S2 from the at least one second electromechanical transducer 152, such that the at least one second electromechanical transducer 152 contracts along the second transverse axis C-C' to release the second clamp 130.

In some embodiments, the method 170 further includes simultaneously or timely sequentially releasing the first clamp 120 and the second clamp 130.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A system for measuring loading on a test specimen, the system comprising:
    a first loading bar and a second loading bar arranged along a longitudinal axis (A-A'), wherein the test specimen is arranged between the first and second loading bars along the longitudinal axis (A-A');
    a first loading unit coupled to the first loading bar and configured to apply a first load to the first loading bar;
    a second loading unit coupled to the second loading bar and configured to apply a second load to the second loading bar;
    a first clamp disposed between the first loading unit and the test specimen along the longitudinal axis (A-A'), wherein the first clamp is configured to hold the first loading bar against the first load, and wherein, upon release of the first clamp, the first loading bar is configured to apply a first loading wave to the test specimen in response to the first load;
    a second clamp disposed between the second loading unit and the test specimen along the longitudinal axis (A-A'), wherein the second clamp is configured to hold the second loading bar against the second load, and wherein, upon release of the second clamp, the second loading bar is configured to apply a second loading wave to the test specimen in response to the second load; and
    a clamp actuating unit configured to selectively release at least the first clamp, the clamp actuating unit comprising:
        at least one first electromechanical transducer switchable between a retained state and a released state, wherein, in the retained state, the at least one first electromechanical transducer is configured to load the first clamp, such that the first clamp holds the first loading bar against the first load, and wherein, in the released state, the at least one first electromechanical transducer is configured to release the first clamp; and
        a controller configured to electrically actuate the at least one first electromechanical transducer from the retained state to the released state to release the first clamp, such that the first loading bar applies the first loading wave to the test specimen.

2. The system of claim 1, wherein the first clamp comprises a pair of first clamping members configured to hold the first loading bar therebetween, wherein the at least one first electromechanical transducer comprises a pair of first electromechanical transducers, and wherein each first electromechanical transducer is configured to load a corresponding first clamping member from the pair of first clamping members.

3. The system of claim 1, wherein the at least one first electromechanical transducer comprises at least one first piezoelectric element configured to expand along a first transverse axis (B-B') inclined to the longitudinal axis (A-A') upon application of a first electrical signal, wherein the at least one first piezoelectric element is further configured to contract along the first transverse axis (B-B') upon removal of the first electrical signal, wherein, in the retained state, the at least one first piezoelectric element expands to load the first clamp, and wherein, in the released state, the at least one first piezoelectric element contracts to release the first clamp.

4. The system of claim 3, wherein the controller is further configured to apply the first electrical signal to the at least one first piezoelectric element to switch the at least one first piezoelectric element to the retained state, and wherein the controller is further configured to remove the first electrical signal from the at least one first piezoelectric element to switch the at least one first piezoelectric element to the released state.

5. The system of claim 1, wherein the clamp actuating unit further comprises a first actuator configured to apply a first clamping force on the at least one first electromechanical transducer, and wherein, in the retained state, the at least one first electromechanical transducer is configured to at least partially transmit the first clamping force received from the first actuator to the first clamp.

6. The system of claim 5, wherein the clamp actuating unit further comprises at least one first support member to support the at least one first electromechanical transducer between the first clamp and the first actuator, and wherein the at least one first support member is configured to receive the at least one first electromechanical transducer through the at least one first support member.

7. The system of claim 1, wherein the clamp actuating unit is further configured to selectively release the second clamp, wherein the clamp actuating unit further comprises at least one second electromechanical transducer switchable between a retained state and a released state, wherein, in the retained state, the at least one second electromechanical transducer is configured to load the second clamp, such that the second clamp holds the second loading bar against the second load, wherein, in the released state, the at least one second electromechanical transducer is configured to release the second clamp, and wherein the controller is further configured to electrically actuate the at least one second electromechanical transducer from the retained state to the released state to release the second clamp, such that the second loading bar applies the second loading wave to the test specimen.

8. The system of claim 7, wherein the second clamp comprises a pair of second clamping members configured to hold the second loading bar therebetween, wherein the at least one second electromechanical transducer comprises a pair of second electromechanical transducers, and wherein each second electromechanical transducer is configured to load a corresponding second clamping member from the pair of second clamping members.

9. The system of claim 7, wherein the at least one second electromechanical transducer comprises at least one second piezoelectric element configured to expand along a second transverse axis (C-C') inclined to the longitudinal axis (A-A') upon application of a second electrical signal, wherein the at least one second piezoelectric element is further configured to contract along the second transverse axis (C-C') upon removal of the second electrical signal, wherein, in the retained state, the at least one second piezoelectric element expands to load the second clamp, and wherein, in the released state, the at least one second piezoelectric element contracts to release the second clamp.

10. The system of claim 9, wherein the controller is further configured to apply the second electrical signal to the at least one second piezoelectric element to switch the at least one second piezoelectric element to the retained state, and wherein the controller is further configured to remove the second electrical signal from the at least one second piezoelectric element to switch the at least one second piezoelectric element to the released state.

11. The system of claim 7, wherein the clamp actuating unit further comprises a second actuator configured to apply a second clamping force on the at least one second electromechanical transducer, and wherein, in the retained state, the at least one second electromechanical transducer is configured to at least partially transmit the second clamping force received from the second actuator to the second clamp.

12. The system of claim 11, wherein the clamp actuating unit further comprises at least one second support member to support the at least one second electromechanical transducer between the second clamp and the second actuator, and wherein the at least one second support member is configured to receive the at least one second electromechanical transducer through the at least one second support member.

13. The system of claim 1, wherein:
the first loading unit is further configured to apply a static torque on the first loading bar, such that the first load is the static torque;
the second loading unit is further configured to apply a static axial force on the second loading bar, such that the second load is the static axial force;
the first loading wave is a torsion wave and the second loading wave is an axial wave;
the first clamp is configured to hold the first loading bar in torsion; and
the second clamp is configured to hold the second loading bar in tension or compression.

14. A method for measuring loading on a test specimen, the method comprising the steps of:
arranging the test specimen between a first loading bar and a second loading bar, wherein the first and second loading bars are arranged along a longitudinal axis (A-A');
holding, via a first clamp, the first loading bar against a first load, wherein, upon release of the first clamp, the first loading bar is configured to apply a first loading wave to the test specimen in response to the first load;
electrically actuating, via a controller, at least one first electromechanical transducer to a retained state, wherein, in the retained state, the at least one first electromechanical transducer loads the first clamp, such that the first clamp holds the first loading bar;
applying, via a first loading unit, the first load to the first loading bar;
holding, via a second clamp, the second loading bar against a second load, wherein, upon release of the second clamp, the second loading bar is configured to apply a second loading wave to the test specimen in response to the second load;
applying, via a second loading unit, the second load to the second loading bar; and
electrically actuating, via the controller, the at least one first electromechanical transducer from the retained state to a released state, wherein, in the released state, the at least one first electromechanical transducer releases the first clamp, such that the first loading bar applies the first loading wave to the test specimen.

15. The method of claim 14, wherein electrically actuating the at least one first electromechanical transducer to the retained state further comprises applying a first electrical signal to the at least one first electromechanical transducer, such that the at least one first electromechanical transducer expands along a first transverse axis (B-B') inclined to the longitudinal axis (A-A') to load the first clamp, and wherein electrically actuating the at least one first electromechanical transducer from the retained state to the released state further comprises removing the first electrical signal from the at least one first electromechanical transducer, such that the at least one first electromechanical transducer contracts along the first transverse axis (B-B') to release the first clamp.

16. The method of claim 14, further comprising applying, via a first actuator, a first clamping force on the at least one first electromechanical transducer, wherein, in the retained state, the at least one first electromechanical transducer is configured to at least partially transmit the first clamping force received from the first actuator to the first clamp.

17. The method of claim 14, further comprising:
electrically actuating, via the controller, at least one second electromechanical transducer to a retained state, wherein, in the retained state, the at least one second electromechanical transducer loads the second clamp, such that the second clamp holds the second loading bar; and
electrically actuating, via the controller, the at least one second electromechanical transducer from the retained state to a released state, wherein, in the released state, the at least one second electromechanical transducer releases the second clamp, such that the second loading bar applies the second loading wave to the test specimen.

18. The method of claim 17, further comprising applying, via a second actuator, a second clamping force on the at least one second electromechanical transducer, wherein, in the retained state, the at least one second electromechanical transducer is configured to at least partially transmit the second clamping force received from the second actuator to the second clamp.

19. The method of claim 14, wherein electrically actuating the at least one second electromechanical transducer to the retained state further comprises applying a second electrical signal to the at least one second electromechanical transducer, such that the at least one second electromechanical transducer expands along a second transverse axis (C-C') inclined to the longitudinal axis (A-A') to load the second clamp, and wherein electrically actuating the at least one second electromechanical transducer from the retained state to the released state further comprises removing the second electrical signal from the at least one second electromechanical transducer, such that the at least one second electromechanical transducer contracts along the second transverse axis (C-C') to release the second clamp.

20. The method of claim 14, further comprising simultaneously or timely sequentially releasing the first clamp and the second clamp.

* * * * *